United States Patent [19]

Wang

[11] Patent Number: 5,547,077
[45] Date of Patent: Aug. 20, 1996

[54] COMPACT DISK DISPLAY AND STORAGE PACKAGE

[75] Inventor: Jin S. Wang, Torrance, Calif.

[73] Assignee: JMR Research Inc., Torrance, Calif.

[21] Appl. No.: 386,750

[22] Filed: Feb. 10, 1995

[51] Int. Cl.⁶ .................................................. B65D 85/57
[52] U.S. Cl. ........................... 206/307.1; 206/425; 383/39
[58] Field of Search .................................. 206/307, 307.1, 206/308.1, 308.3, 312, 313, 387.1, 425; 383/38, 39

[56] References Cited

U.S. PATENT DOCUMENTS

| | | | |
|---|---|---|---|
| 259,410 | 6/1882 | Marmaduke | 383/39 |
| 860,264 | 7/1907 | Stevens | 383/39 X |
| 3,749,237 | 7/1973 | Dorton | 383/39 X |
| 4,502,596 | 3/1985 | Saetre et al. | 206/387.1 |
| 4,651,872 | 3/1987 | Joyce | 206/308.3 X |
| 4,762,225 | 8/1988 | Henkel | 206/308.1 X |
| 4,859,084 | 8/1989 | Kaumeyer | 383/39 |
| 4,949,843 | 8/1990 | Stokes | 383/38 X |
| 5,048,683 | 9/1991 | Westlake | 383/39 X |
| 5,170,889 | 12/1992 | Cue | 206/425 X |

Primary Examiner—Jacob K. Ackun
Attorney, Agent, or Firm—G. Joseph Buck

[57] ABSTRACT

A package for the storage and display of products such as video game cartridges and compact disks. The package consists of an elongated strip of transparent flexible plastic or similar material having a series of pockets or pouches attached to the the strip. The package may be hung from a hole at one end of the strip to display the contents of each of the pockets, the pockets all opening upwards towards the end of the strip from which the package is hung. The strip includes hinging portions between the pockets so that the cartridges or disks in the pockets can be folded together, in a zig-zag or accordion fashion to form a compact stack. When folded into a stack, a flap at one end of the strip may be folded over one side of the stack and fastened to the other end of the strip so as to hold the cartridges or disks in place in the stack, but at the same time allowing the side of the stack opposite to the flap to be opened so that the cartridges or disks can be examined one at a time, in a manner similar to opening a book, one page at a time.

8 Claims, 3 Drawing Sheets

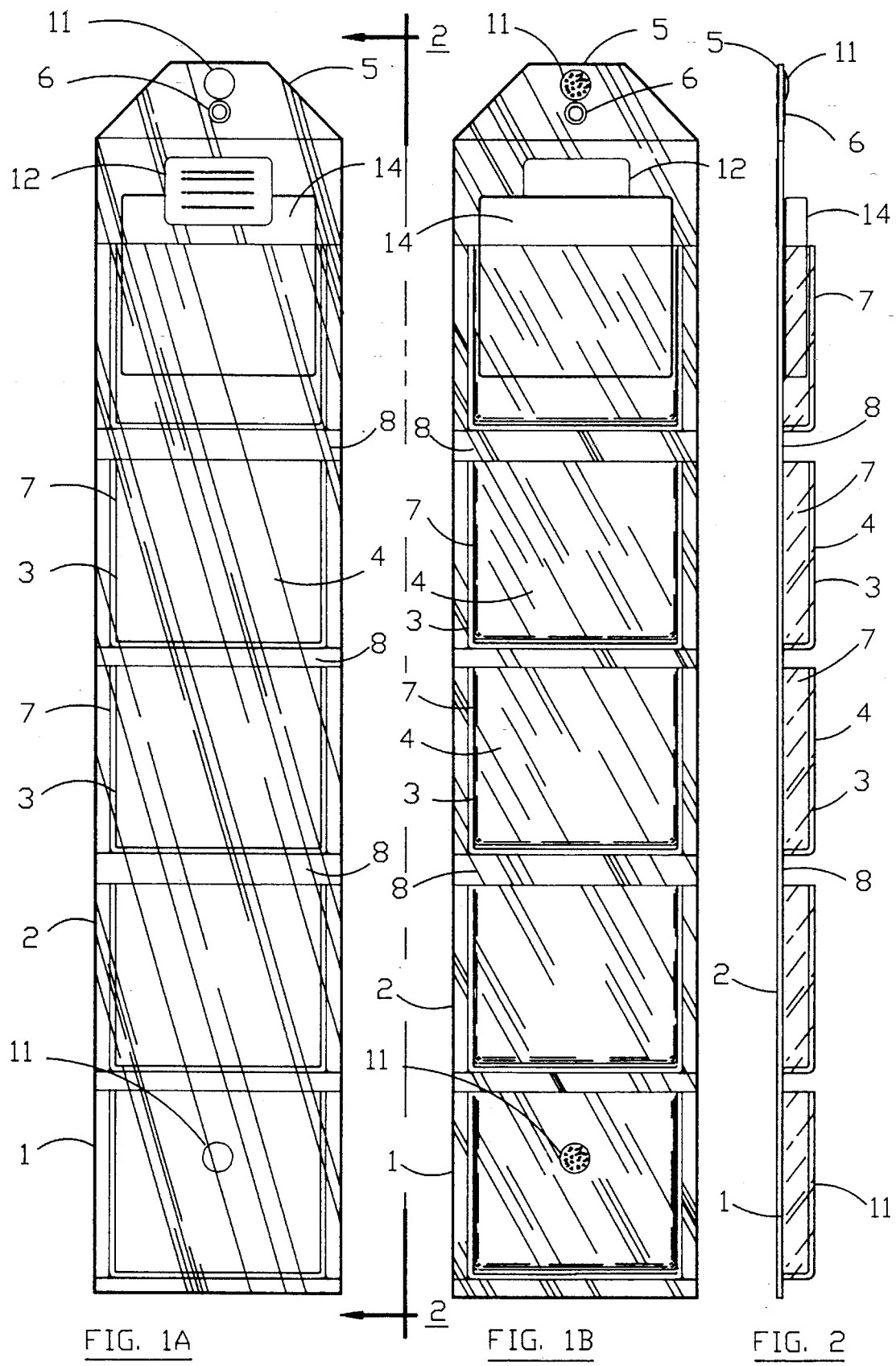

COMPACT DISK DISPLAY AND STORAGE PACKAGE

BACKGROUND OF THE INVENTION a. Field of the Invention

This invention pertains to folding packages for the display, carrying and storing of articles. More particularly, this invention pertains to folding packages for the displaying, carrying and storing of a number of similar, relatively thin and relatively flat items, such as video game cartridges, "jewel boxes" or "jewel cases" that are used for the display, sale and storage of video compact disks or CD-ROMs, audio or video tape cassettes or other product containers. Graphic and printed material describing the contents typically are placed on the exterior of product container. For the display and sale of a set of related products that may be sold as one set or a single unit, the package should allow the customer to view the descriptive material on the cover of each product container, while retaining the products together as one set.

b. Description of the Prior Art

U.S. Pat. No. 5,291,990 ("990") describes a packaging and display system in which a number of rectangular boxes are fastened together by hinges placed in alternating fashion along the back edges and the front edges of the boxes so that the boxes may be folded together in accordion fashion to form a compact stack of the boxes. When folded together, Velcro or adhesive dots hold the boxes together in the folded configuration. The "990" patent, however, directly fastens the boxes together and does not allow for the removal and re-attachment of one box from and to the set of boxes.

U.S. Pat. No. 4,502,596 ("596") describes a plastic strip containing a series of side-by-side pockets into which pockets game cartridges may be inserted. The cartridges in the strip may be folded together, accordion-fashion, into a compact stack. The folded cartridges may then be retained in one stack by slipping an elastic retaining loop around the entire stack. The "596" patent, however, discloses a package that may be "hung up" on a hook for storage or display only when the cartridges are folded and held together in one stack. When hung in the folded or stacked configuration, only the top most game cartridge is displayed for viewing by a potential customer. If one wished to display all of the game cartridges in the strip by unfolding the stack and hanging the package from the pair of handles located near the opposite ends of the package, the central area of the package would droop in an unsatisfactory manner. If, instead, one hung the package by one end, i.e. by the tab 37, then the cartridges would tend to spill out of the pockets because the pockets would then open toward the side of the package in a horizontal direction.

When cartridges in the "596" invention are stacked together in accordion fashion and the stack is then held together by the encompassing elastic strap, one is unable to examine the descriptive material on the face of each of the cartridges without first removing the elastic strap, which removal, in turn, would allow the entire stack to fall completely open.

SUMMARY OF THE INVENTION

The present invention uses a package in the form of a flexible, elongated, transparent strip containing a series of pockets into which individual products such as game cartridges, rectangular "jewel cases" or "jewel boxes" containing compact disks, audio or video tape cassettes or other similar products or product containers may be inserted. Such products or product containers will be referred to herein generally as product containers. All of the pockets on the present invention open towards one end of the elongated strip so that the strip may be hung from one end to display the package's contents to potential customers. In the hanging configuration, the package securely holds the cartridges or boxes within the pockets because all of the pockets open in an upward direction toward the end from which the strip is hung. A customer may remove, individually, each product container stored and displayed within the package, examine it and the reinsert it into its respective pocket in the strip. The pockets are spaced far enough apart upon the strip so as to allow for "hinging" spaces between the pockets on the strip so that the package, with the product containers stored therein, may be folded, accordion-fashion, to form a compact stack of product containers.

The present invention includes a flap at one end of the strip that when the package has been folded, accordion-fashion into a stack, the flap can be folded over the end of the stack of product containers and attached by Velcro or other fastening means to the other end of the strip so as to hold the stack together in a manner somewhat similar to that of the binding of a book. In this folded or stacked configuration, with the flap fastened to the other end of the strip, the stack of product containers may still be opened from the side opposite to the flap so that a customer may view the product containers one at a time as if they were pages in a book. In the fastened position, the flap thus tends to retain the product containers in the stacked position while still allowing the opposite side of the stack to be opened to look at the individual product containers. When the packages are folded into compact stacks, a number of such folded packages may be stored or displayed side-by-side with identifying labels or the flaps visible to the customer.

BRIEF DESCRIPTION OF THE DRAWINGS

FIG. 1A is a front view of the package as it would appear when hanging from a hook that is hooked to the top flap.

FIG. 1B is a rear view of the package as it would appear when hanging from a hook that is hooked to the top flap.

FIG. 2 is a cross-sectional, side view of the package as it would appear when hanging from a hook.

DETAILED DESCRIPTION

Figure 3:
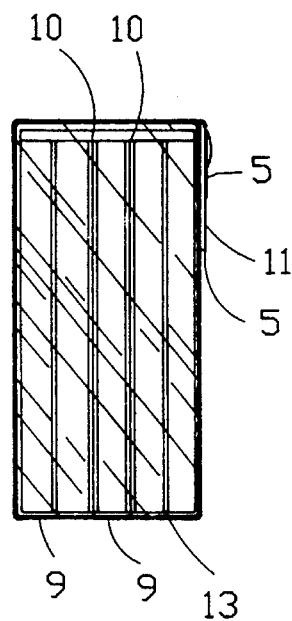
FIG. 3 is a side view of the package after it has been folded, accordion-fashion into one stack of product containers.
Figure 4A:
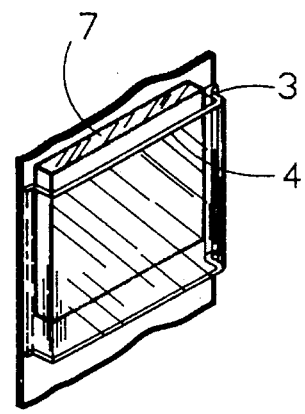
FIG. 4A is a pictorial view of one pocket on the strip with a product container inserted in the pocket.
Figure 4B:
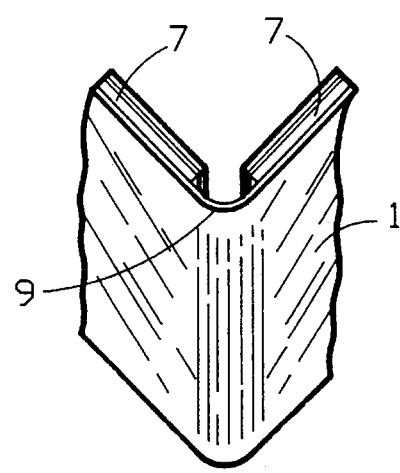
FIG. 4B depicts one portion of the strip that operates as a hinge.

Referring now to FIGS. 1, 2 and 3 and which are front, rear and cross-sectional side views of the package. In the preferred embodiment, the package 1 is a carrier strip 2 constructed of an elongated transparent sheet of flexible plastic A series of rectangular sheets 3 of flexible plastic are each attached along three edges to the rear surface of the carrier strip 2 and the fourth edge of each rectangular sheet is left open so as to form a series of pockets 4 or pouches on the strip. Product containers 7 may be inserted into pockets 4 for storage and display. For the purpose of illustration, product container 14 is depicted as being partially withdrawn from its pocket. However, in normal use, product container 14 also would be placed fully into its pocket, similarly to product containers 7. Although in the preferred embodiment all of the pockets 4 are depicted as being located on the same surface, i.e. the rear surface of carrier strip 2, it should be understood that all of the pockets could, instead, be located on the front surface of the carrier strip and it should also be understood that some of the pockets could be located on the front surface and some of the pockets located on the rear surface of carrier strip 2.

Carrier strip 2 has a flap 5 at one end of the strip, which flap has a hole in it surrounded by a reinforcement 6 from which the entire package can be hung on a hook for display of the product containers to customers. Other hanging devices could be used in place of a hole. For instance a strap, an eyelet, a piece of Velcro, or hook could be attached to the flap so that the strip could be hung from such hanging device and thus supported from one end. All of pockets 4 on carrier strip 2 are oriented such that the pockets all open towards the end of the carrier strip having the hole or other hanging device so that when the carrier strip is hung from that end, all of the pockets open upwards and their contents remain securely within the pockets.

The pockets attached to the carrier strip are separated by hinging portions 8 on the flexible carrier strip which portions of the carrier strip are flexible and of sufficient width to allow the carrier strip, with the product containers stored in the pockets, to be folded up, accordion-fashion, i.e. in a zig-zag fashion, into a single stack as depicted in FIG. 3. Because, in the preferred embodiment the pockets that hold the product containers are all located on the same side (surface) of the carrier strip and because the pockets are folded together in a zig-zag or accordion manner, the widths of the hinging portions 8 alternate between having a relatively narrow width and having a somewhat broader width so as to provide two differing widths of hinge depending upon whether the particular hinge 9 spans the thickness of two product containers or operates as hinge 10 located between two such product containers.

In the stacked or closed configuration depicted in FIG. 3, top flap 5 is closed over one side of the stack and fastened to the opposite end of the carrier strip by means of fastening device 11. Fastening device 11 may be a Velcro-type fastener attached to the flap and the opposite end of the carrier strip. Fastening device 11 could, instead, be a snap-type fastener or other fastening device.

Figure 5:
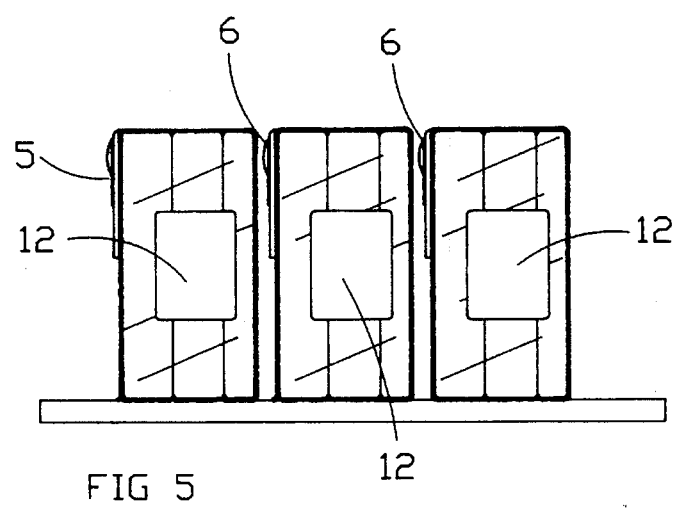
FIG. 5 depicts a number of packages that are folded into stacks and displayed or stored side-by-side on a shelf.
Figure 6:
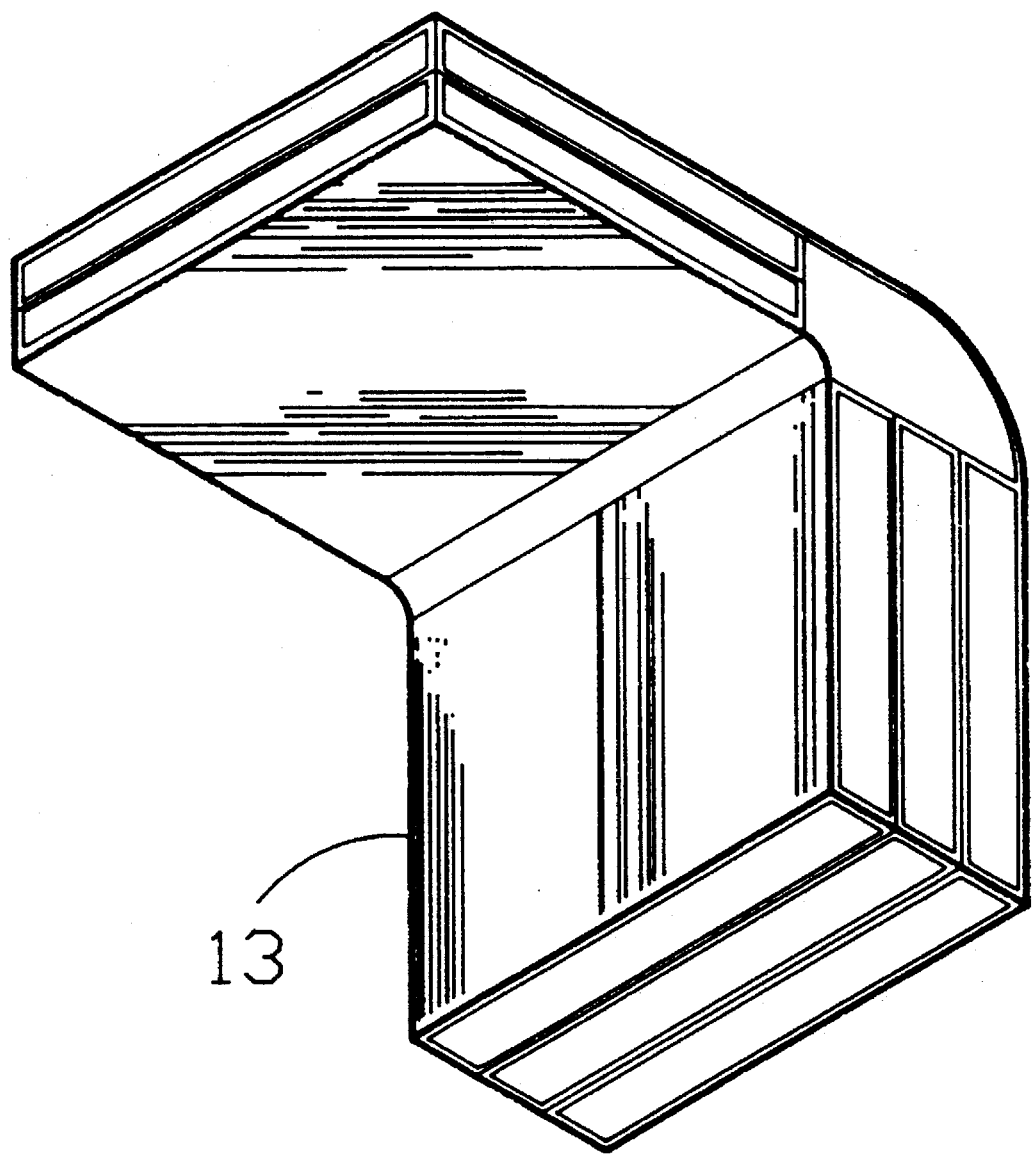
FIG. 6 is a pictorial view of the package which has beer opened from the side opposite to the flap for viewing of an individual product container.

As depicted in FIG. 6, when flap 5 is fastened to the opposite end of the carrier strip, flap 5 provides a measure of rigidity to the stack, but still allows the stack to be opened from side 13 of the stack opposite to the flap in a manner somewhat similar to that of opening a book so that a customer can look at the individual product containers without unfolding the entire stack. If an identifying label 12 is placed on the outside of the flap, then a number of such closed packages can be stored and displayed side-by-side on a shelf as depicted in FIG. 5 with the contents of each package identified by label 12 on each flap.

It should be understood that although in the preferred embodiment the carrier strip and the pockets are both made of transparent material so as to maximize the ease with which a customer may view descriptive material appearing on both sides of the product containers, either the carrier strip or the pockets, or both, could be made of non-transparent material. Furthermore, although in the preferred embodiment, the carrier strip and the pockets are all made out of flexible material, such flexibility, or its equivalent is only needed to the extent necessary to provide a hinging action between the pockets.

It also should be understood that although for simplicity of description the strip is described as having a "front" and a "rear" surface and the pockets are described as being attached to the rear surface of the strip, the terms "front" and "rear" have no other significance except to indicate opposite surfaces of the strip.

Finally, it should be understood that even though the flap and the hanging device is depicted as being located near the same end of the strip, the flap could be at one end of the strip and the hanging device located near the other end of the strip.

I claim:

1. A package for the display and storage of product containers comprising:

a carrier strip comprising a flexible, elongated sheet-form material, said carrier strip having a front and a rear surface and having a first and second end, a plurality of pocket covers made of sheet-form material, the pocket covers being attached to the carrier strip, each pocket cover forming a pocket suitable for containing and holding a product container, each pocket having an opening of sufficient size to allow the insertion into or removal from the pocket of a product container, the plurality of pocket covers being located substantially adjacent to each other so as to form a plurality of substantially adjacent pockets oriented in a column aligned with the elongated dimension of the carrier strip and the opening of each pocket being oriented toward the first end of the carrier strip, the adjacent pockets being separated by hinging portions of the carrier strip, said hinging portions allowing the carrier strip with the product containers inserted therein to be folded in an accordion-like manner into a stack of the pockets, said hinging portions, when in the one of said fastening devices located on the flap, and the other of said fastening devices positioned relative thereto so that stacked configuration, is disposed alternately along a first side of the stack and along only a second side of the only stack, said second side of the stack being on the opposite side of the stack from the first side of the stack, the carrier strip further including a flap at one end of the carrier strip, the carrier strip also including a fastening device at each end thereof, for fastening the flap to the opposite end of the carrier strip when the carrier strip is folded in an accordion-like manner into a stack, one of said fastening devices located on the flap, and the other of said fastening devices positioned relative thereto so that the flap, when fastened to the opposite end of the carrier strip is situated substantially adjacent to the hinging portions along only the first side of the stack, whereby said flap constrains the movement relative to each other of said hinging portions located along the first side of the stack, while allowing the hinging portions located along the first side of the stack to operate as hinges for angular movement about said hinges of pairs of adjacent pockets relative to other pairs of adjacent pockets, and at the same time allowing the second side of the stack to be opened in a manner similar to opening a book, so that the product containers can be examined one at a time.

2. The package of claim 1 and further comprising a hanging device at one end of the carrier strip suitable for hanging the carrier strip upon a hook for display of the product containers.

3. The package of claim 1 wherein the carrier strip and the plurality of pocket covers are transparent.

4. The package of claim 2 wherein the carrier strip and the plurality of pocket covers are transparent.

5. The package of claim 1 wherein all of the pocket covers are attached to the rear surface of the carrier strip.

6. The package of claim 2 wherein all of the pocket covers are attached to the rear surface of the carrier strip.

7. The package of claim 3 wherein all of the pocket covers are attached to the rear surface of the carrier strip.

8. The package of claim 4 wherein all of the pocket covers are attached to the rear surface of the carrier strip.

* * * * *